United States Patent
Clarke et al.

(10) Patent No.: US 7,894,386 B2
(45) Date of Patent: *Feb. 22, 2011

(54) MOBILE TELEPHONY

(75) Inventors: Matthew Alexander Clarke, Northants (GB); Duncan Paul Balmbra, Reading (GB)

(73) Assignee: Stratos Global Limited, London (GB)

( * ) Notice: Subject to any disclaimer, the term of this patent is extended or adjusted under 35 U.S.C. 154(b) by 633 days.

This patent is subject to a terminal disclaimer.

(21) Appl. No.: 11/907,574

(22) Filed: Oct. 15, 2007

(65) Prior Publication Data

US 2008/0125112 A1  May 29, 2008

Related U.S. Application Data

(62) Division of application No. 10/069,223, filed as application No. PCT/GB00/03087 on Aug. 10, 2000, now Pat. No. 7,286,503.

(30) Foreign Application Priority Data

Aug. 25, 1999  (GB) ................................. 99306763.6
Apr. 14, 2000  (GB) ................................. 00303164.8

(51) Int. Cl.
     *H04W 4/00*  (2009.01)
(52) U.S. Cl. ..................................... 370/328; 455/422.1
(58) Field of Classification Search ........................ None
     See application file for complete search history.

(56) References Cited

U.S. PATENT DOCUMENTS

| | | | |
|---|---|---|---|
| 4,774,514 A | 9/1988 | Hildebrandt et al. |
| 5,073,972 A | 12/1991 | Tendler et al. |
| 5,210,786 A | 5/1993 | Itoh |
| 5,438,610 A | 8/1995 | Bhagat et al. |
| 5,444,762 A | 8/1995 | Frey et al. |
| 5,490,284 A | 2/1996 | Itoh et al. |
| 5,519,761 A | 5/1996 | Gilhousen |
| 5,557,656 A | 9/1996 | Ray et al. |

(Continued)

FOREIGN PATENT DOCUMENTS

EP   0 838 909   4/1989

(Continued)

OTHER PUBLICATIONS

Suzuki et al., "Call Routing and Data Model for Inter-Network Roaming in PCS," IEICE Trans. Commun., vol. E79 B. No. 9, Sep. 1996, pp. 1371-1379.

(Continued)

*Primary Examiner*—Ajit Patel
(74) *Attorney, Agent, or Firm*—Steptoe & Johnson LLP

(57) ABSTRACT

A satellite telephone system for communication between a fixed network (4) and a moveable network (1) on board a vehicle, has means for suspending operation of the moveable network, for example when the moveable network could interfere with a fixed network, during safety-critical stages of a flight, or to enforce "quiet" periods on board. When operation of the moveable network (1) is suspended a control signal is transmitted to the fixed network (4), causing the fixed network (4) to intercept calls directed to the moveable network, thereby avoiding unnecessary signal traffic over the satellite link (3, 6, 13). The moveable network may be a wireless network (FIGS. 1, 2), or a wired network (FIG. 4).

13 Claims, 5 Drawing Sheets

U.S. PATENT DOCUMENTS

Figure 1:
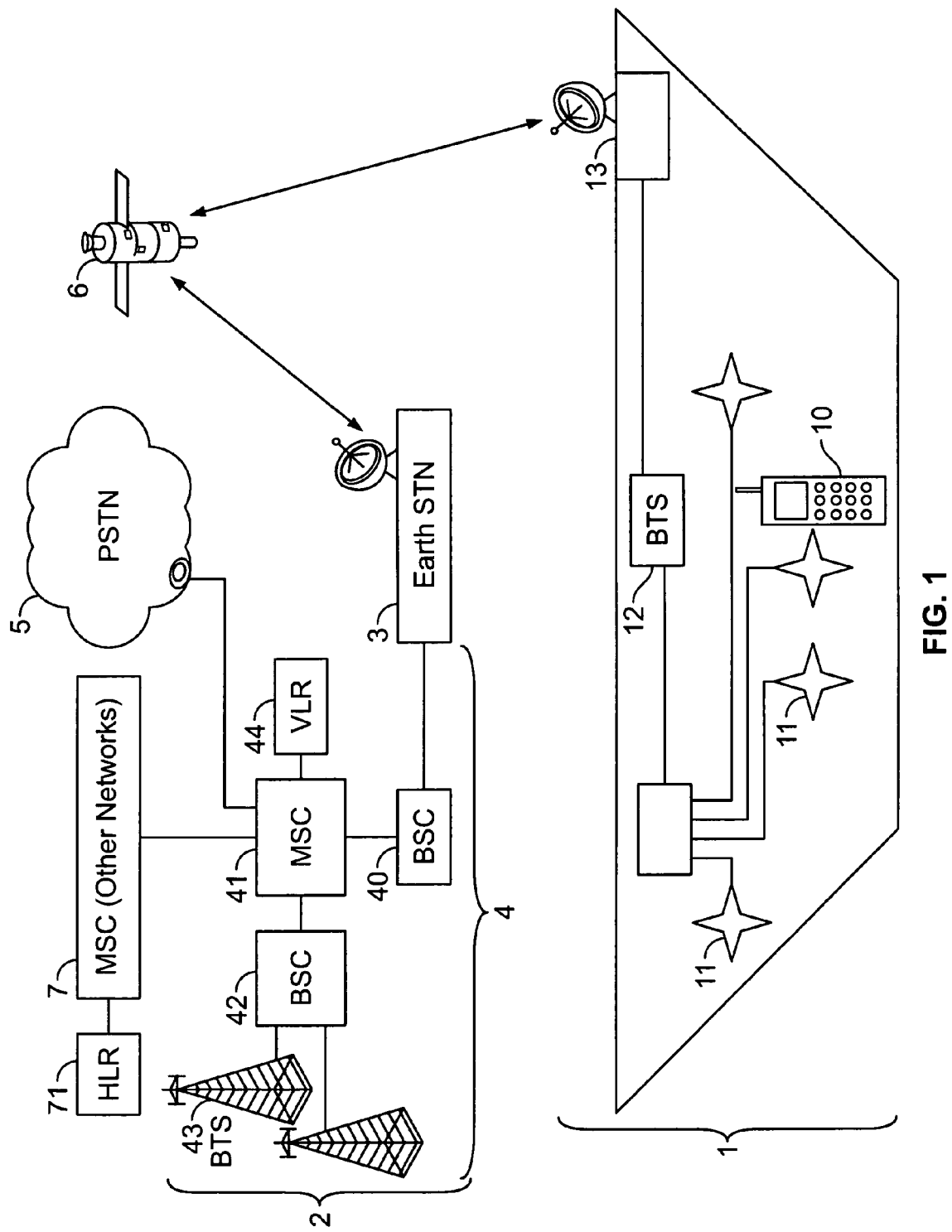

| | | | |
|---|---|---|---|
| 5,832,380 | A | 11/1998 | Ray et al. |
| 5,842,132 | A | 11/1998 | Fukutomi |
| 5,887,258 | A | 3/1999 | Lemozit et al. |
| 5,946,618 | A | 8/1999 | Agre et al. |
| 5,950,129 | A | 9/1999 | Schmid et al. |
| 5,963,877 | A | 10/1999 | Kobayashi |
| 5,995,833 | A | 11/1999 | Zicker |
| 6,002,944 | A | 12/1999 | Beyda |
| 6,032,041 | A | 2/2000 | Wainfan et al. |
| RE36,712 | E | 5/2000 | Sato et al. |
| 6,108,539 | A | 8/2000 | Ray et al. |
| 6,115,580 | A * | 9/2000 | Chuprun et al. ............ 455/1 |
| 6,128,468 | A | 10/2000 | Wyrwas |
| 6,269,243 | B1 | 7/2001 | Corbefin et al. |
| 6,741,841 | B1 | 5/2004 | Mitchell |
| 6,834,188 | B1 | 12/2004 | Menon |
| 7,113,780 | B2 * | 9/2006 | McKenna et al. ........... 455/431 |
| 7,286,503 | B1 * | 10/2007 | Clarke et al. ............... 370/328 |
| 2002/0045444 | A1 | 4/2002 | Usher et al. |
| 2002/0142717 | A1 | 10/2002 | Morimoto |
| 2006/0270470 | A1 * | 11/2006 | de La Chapelle et al. 455/575.5 |
| 2008/0064328 | A1 * | 3/2008 | Wesel ...................... 455/13.3 |

FOREIGN PATENT DOCUMENTS

| | | |
|---|---|---|
| EP | 0 862 283 | 9/1998 |
| EP | 0 915 577 | 5/1999 |
| EP | 0 920 147 | 6/1999 |
| EP | 0 923 257 | 6/1999 |
| EP | 0 932 266 | 7/1999 |
| EP | 0 936 829 | 8/1999 |
| FR | 2773931 | 7/1999 |
| GB | 2169175 | 7/1986 |
| GB | 2282299 | 3/1995 |
| GB | 2310973 | 9/1997 |
| GB | 2320992 | 7/1998 |
| GB | 2324395 | 10/1998 |
| WO | WO94/28684 | 12/1994 |
| WO | WO94/28684 A1 | 12/1994 |
| WO | WO97/36442 | 10/1997 |
| WO | WO97/37500 | 10/1997 |
| WO | WO98/21838 | 5/1998 |
| WO | WO98/26521 | 6/1998 |
| WO | WO99/12227 | 3/1999 |
| WO | WO99/62274 | 12/1999 |
| WO | WO01/15337 | 3/2001 |

OTHER PUBLICATIONS

Uchiyama et al., "Network Functions and Signaling for Personal Roaming between Digital Cellular Standards," IEEE International Conference on Universal Personal Communications, New York, IEEE, vol. Conf. 4, Nov. 1995, pp. 447-451.

Nodera et al., "Interworking between GSM and PDC through IC Cards," Proceedings of the Conference on Communications (ICC), New York, IEEE, Jun. 1995, pp. 761-765.

GSM World Press Release, "GSM Association Agreement with SkyPhone to use TAP for Billing makes Calling from Aircraft Simple," http://www.gsm.org/news/press_releases_04.html, Aug. 1999.

Fernandez et al., "Le TFTS Alcatel 9810: un systemme europeen de communications air-sol," Commutation et Transmission, vol. 13, No. 4, Sotelec, Paris, France, 1991, pp. 5-16.

BTtoday Newsdesk website, "Lift off for BT in-flight GSM service," http://today.intra.bt.com/art6594.html, Jul. 2000.

Beresford, "Office in the sky is now ready for take off," BT today, Jan. 2000, p. 4.

International Search Report for PCT/IB01/00830.
International Search Report for PCT/GB00/03074.
International Search Report for PCT/GB00/03087.
International Search Report for PCT/IB01/00811.
International Search Report for PCT/GB00/03088.
International Search Report for PCT/IB01/00802.

* cited by examiner

MOBILE TELEPHONY

The instant application is a divisional of and claims priority to U.S. patent application Ser. No. 10/069,223 filed on Nov. 22, 2002, now U.S. Pat. No. 7,286,503, which is a national stage entry of PCT/GB00/03087 filed Aug. 10, 2000, which claims priority to GB 993067633.6 filed Aug. 25, 1999 and GB00303164.8 filed Apr. 14, 2000.

This invention relates to mobile telephony, and in particular to systems for use on board vehicles.

There has been considerable activity in recent years in proposals to allow the use of mobile telephones in environments where conventional cellular telephony base stations cannot provide coverage, in particular on board ships and aircraft. These vehicles frequently travel beyond the range of land-based base stations, which typically have a range of the order of 1 to 10 km. In order to conserve power, the base stations often have azimuthally directed antennas, so even when over land, an aircraft may be too far above the nearest base station for a cellular telephone to communicate reliably with a base station on the ground. Particularly on aircraft, there are also restrictions on the use of powerful radio signals, enforced as a precaution against possible interference with the aircraft's electronic systems.

To overcome these difficulties there have been several proposals to allow users to make and receive calls using a tracking radio link (usually using a satellite system) between the vehicle and a ground station. In its simplest form the user is provided with an at-seat handset. Such systems are in commercial service, for example the service provided by the applicant company to several airlines, under the Registered Trade mark "Skyphone".

Proposals have also been made to allow a user to use his own cellular radio identity, instead of a special identity under the satellite system when using the satellite facility. This would allow billing to be made through the user's normal cellular radio account, and would also allow incoming calls made to his cellular telephone number to be received whilst travelling. To this end, systems have been developed which allow call diversions to be set up to allow calls made to the user's cellular number to be transferred to a destination node of the tracking radio system. The destination node may be an onboard handset temporarily allocated the user's cellular identity, or it may be an onboard base station capable of wireless connection to the user's own cellular telephone.

Systems of this general kind have been disclosed in International Patent Applications WO99/12227 (Nokia), WO94/28684 (Nordictel) and WO98/26521 (Ericsson); European Patent Applications 0920147 (Alcatel) and 0915577 (Rohde & Schartz), United Kingdom Patent Application 2310973 (Motorola), and the applicant's earlier European Patent application 99306763.6. An onboard base station can readily be integrated with the onboard systems of an aircraft, allowing control of its own transmitter, and those of the mobile units with which it is co-operating, to keep their power within safe limits.

The systems described in the applicant's European Patent applications and 99307279.2, and the applications having the applicant's case references A25938 and A25941 which were filed on the same date as the present application, effect call diversion to a satellite network by emulating the presence of the user's handset an a "host" cellular network to set up a "call diversion on busy" instruction to a termination point on the satellite network, and arranging for the host network to emulate a permanent "busy" condition for the user's handset.

There are a number of circumstances in which an onboard system needs to be switched off. For example, when an aircraft is close to or on the ground, or a ship is close to shore, the onboard cellular base station could interfere with ordinary cellular base stations nearby. The INMARSAT geostationary satellite system covers the entire planet with only five satellites, but nevertheless on long distance flights, particularly transpolar flights, an aircraft may be unable to retain contact with the same satellite throughout. It may therefore be necessary for an aircraft's satellite system to change the satellite through which it is communicating, which necessitates a change in the addressing of all its telephone nodes, and hence to the call diversion instructions relating to any cellular user on board. It may be necessary to shut the onboard system down for a short period whilst this is done.

It may also be desirable to shut the system down during safety-critical stages of a flight, or to enforce designated "quiet" periods on board. Furthermore, when the vehicle completes its journey, it is desirable to shut down the system to allow the users to register their cellular handsets with the local cellular network in the normal way once they have alighted.

However, whilst the system is shut down, any incoming calls will continue to be directed to the onboard system, causing unnecessary signalling traffic over the satellite link. The present invention relates to a method for avoiding this problem.

According to the invention there is provided a method of controlling a telephone system for communication between a fixed network and a moveable network, the system having means for suspending operation of the moveable network, wherein when operation of the moveable network is suspended a control signal is transmitted to the fixed network, causing the fixed network to intercept calls directed to the moveable network. A further control signal is transmitted when operation of the moveable network is resumed, causing the fixed network to cease to intercept calls.

In the systems disclosed in the present applicant's European Patent Applications referred to above, a call diverted to the satellite system which is subsequently tailed because of disconnection of the onboard satellite system would be handled according to the diversion instructions stored by the user in the Home Location Register ("HLR") of his home network. This would route the call to a selected alternative number, usually a messaging service or "voicemail" box. Some voicemail systems have a means for alerting a user of the presence of such messages when they next re-connect to the network, or when they complete the call that they were engaged on when the failed call attempt was made. However, the "host" network emulates a permanent "busy" condition for the handset for the entire period the user is registered with the onboard cell, so such alerting may not operate correctly when the user is re-connected to the satellite system after a temporary disconnection.

To allow the user to receive suitable alerting signals on re-connection of the onboard system, the invention may therefore also provide that the fixed system stores details of call attempts made during the period of suspension, and on resumption of service transmits en alert signal to any user to whom such a call attempt has been made.

The invention also extends to moveable and fixed apparatus arranged to co-operate to perform this method.

Figure 2:
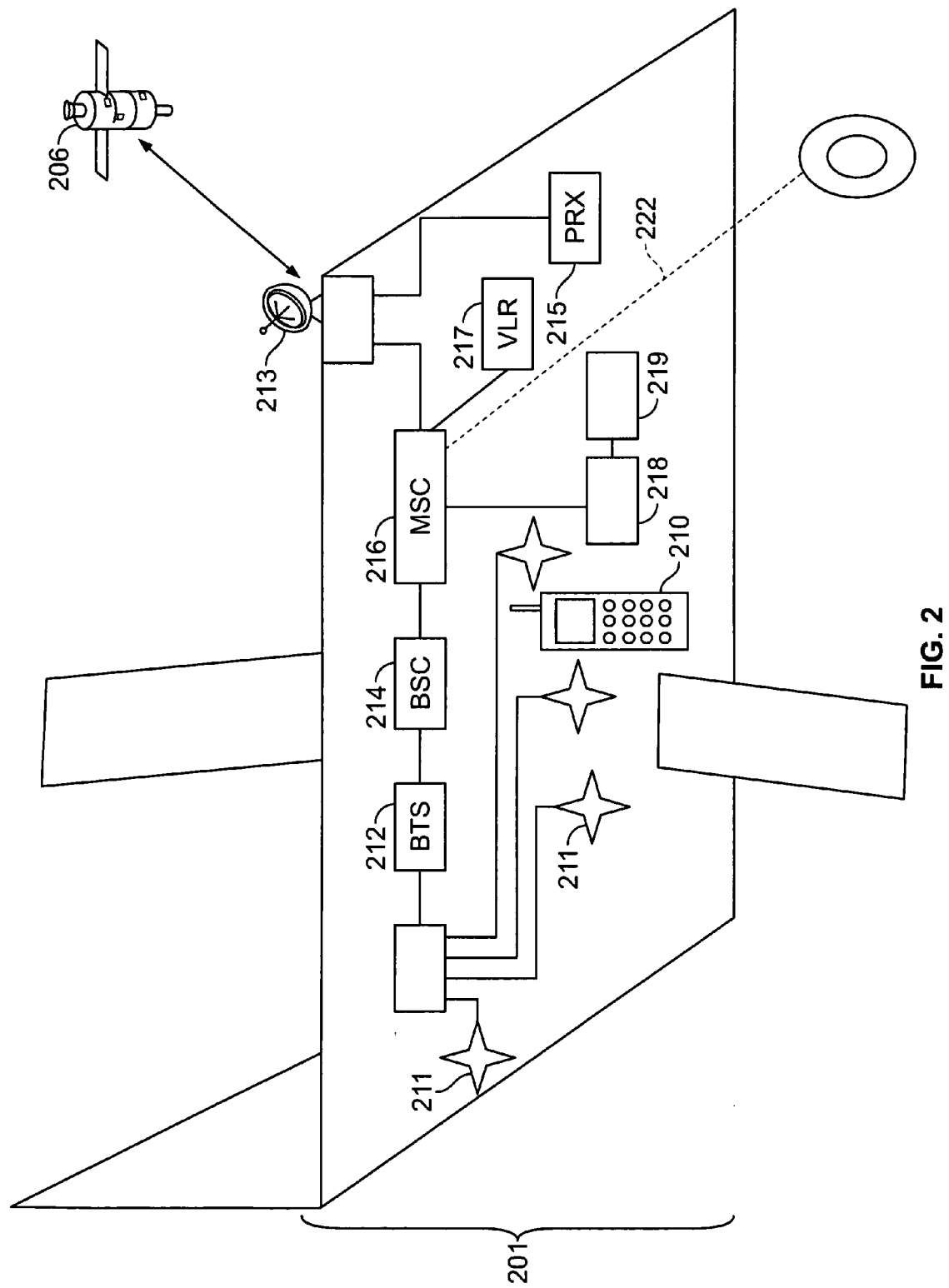
Figure 3:
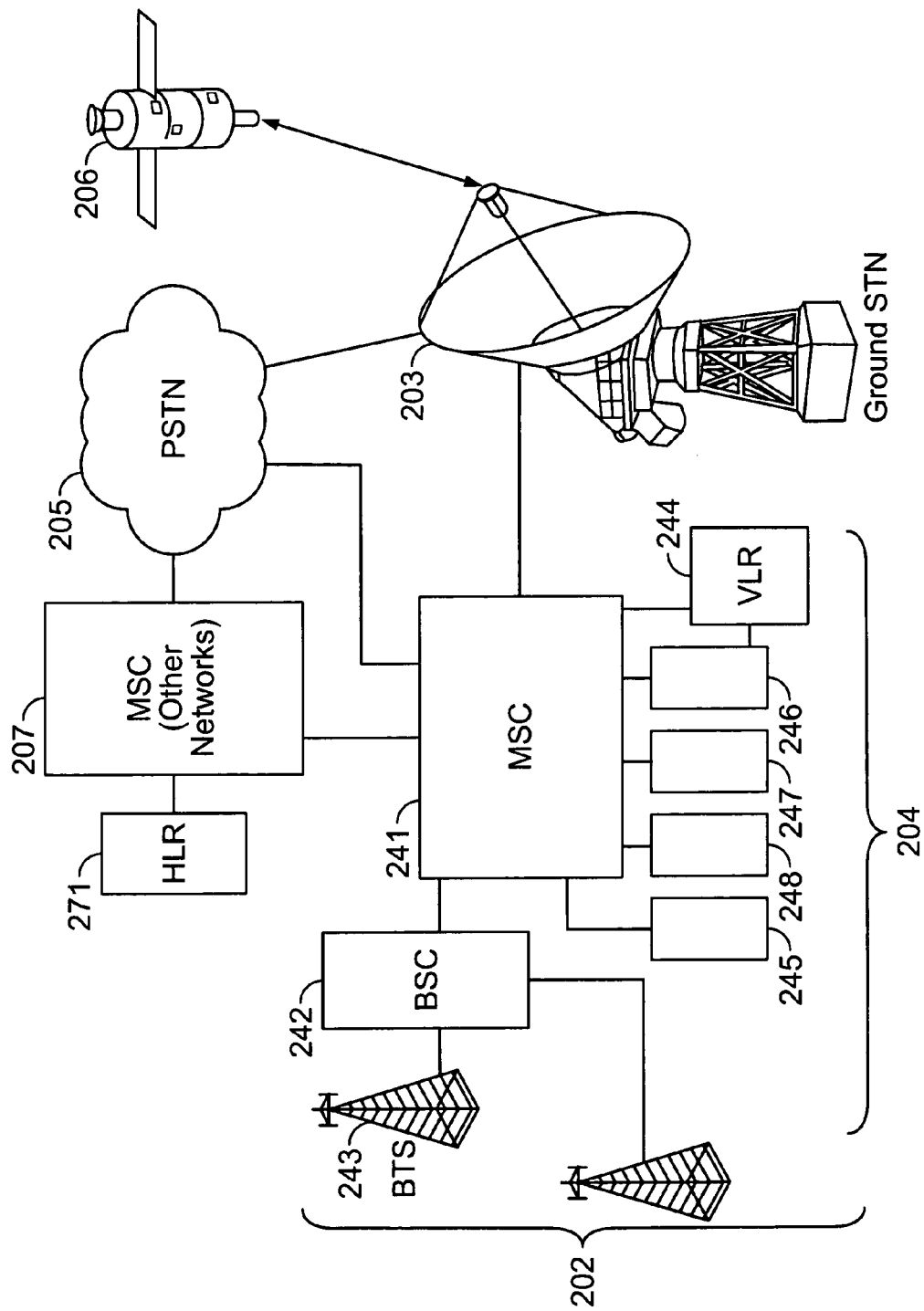
Figure 4:
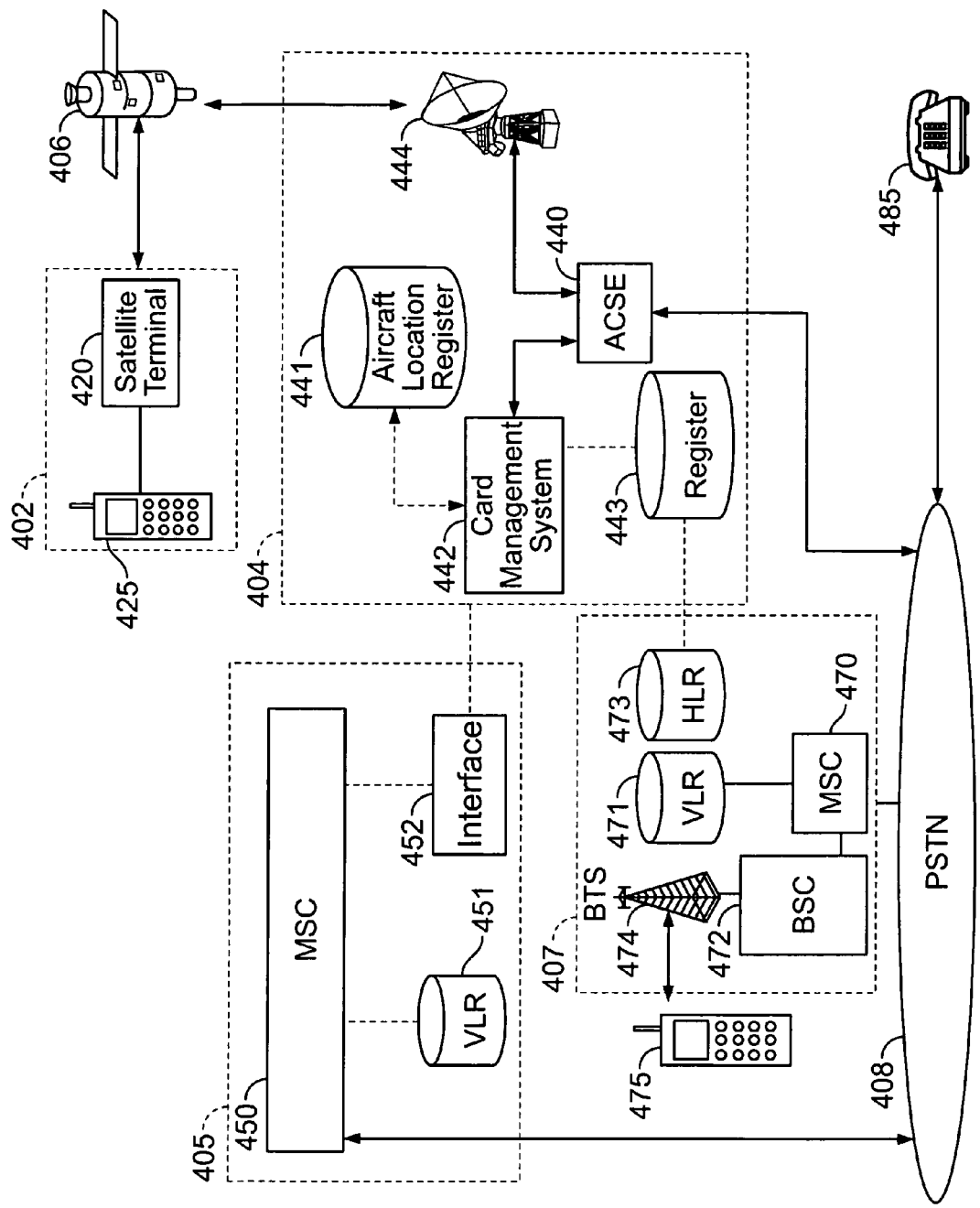
Figure 5:
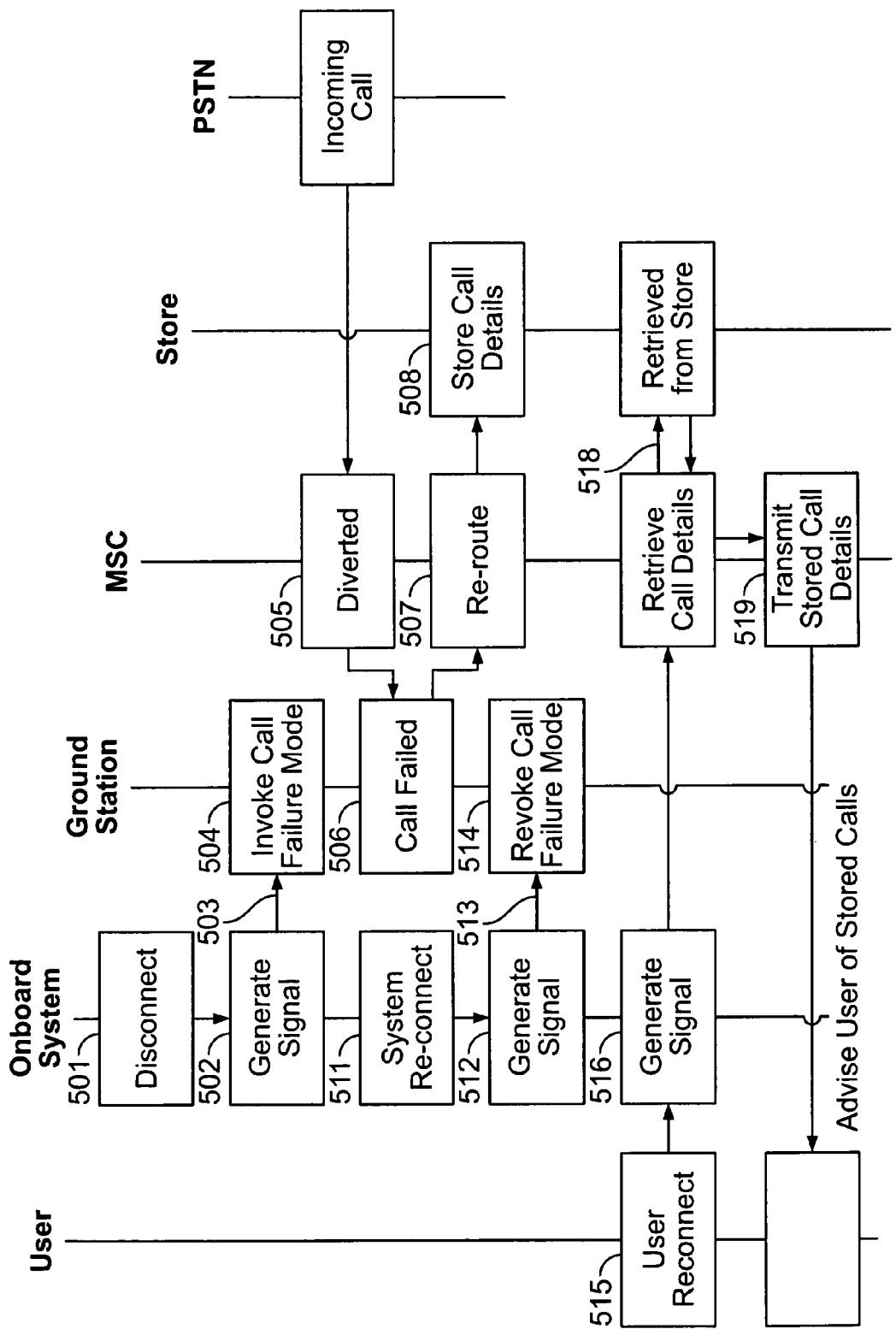

Embodiments of the invention will now be described with reference to the drawings, in which FIG. 1 shows the general arrangement of the system disclosed in the applicant's European Patent Application 99306763.6, FIGS. 2 and 3 show the general arrangement of the system disclosed in the applicant's European Patent Application having applicant's reference A25941 and filed on the same day as the present application FIG. 4 shows the general arrangement of the system disclosed in the applicant's European Patent Application 99307279.2, FIG. 5 is a flow chart showing the method according to the invention, applied to any of the above systems.

The arrangement of FIG. 1 is primarily designed for use on ships. The system can be categorised into two main components: namely the shipboard part 1 and the fixed part 2, communicating with each other through a satellite connection 6. The fixed part 2 is itself in two parts, namely a satellite earth station 3 and a public land mobile network (PLMN) 4, which is in turn interconnected with other mobile networks 7 and fixed networks 6 to allow calls to be made between users of different networks.

The system provides a cellular radio subscriber with the ability to use his own handset 10 aboard a ship, located anywhere within an agreed satellite coverage area. The coverage aboard ship can be provided by any suitable means, using known radio repeater distribution systems 11 to provide radio coverage wherever required.

The distribution system 11 is fed by a base transceiver site 12, for onward transmission to the satellite earth station 3 via a satellite tracking system 13. The satellite tracking system may be a conventional satellite telephone system as commonly used for ship-to-shore communications, providing a satellite link 6 from the ship's satellite tracking system 13 to the satellite earth station 3. In the embodiment of FIG. 1, the satellite earth station 3 is in turn connected to a Base Site Controller (BSC) 40 associated with the mobile switching centre (MSC) 41 of a conventional cellular telephone system. The satellite connection provides several voice channels and a signalling channel (supervisory control-management channel), and can be made by any connection of appropriate capacity.

Both the base transceiver site 12 and the shore-based base site controller 40 have an extra software upload facility to allow for the delays incurred over the satellite link 3-6-13, but are otherwise conventional. The base site controller 40 operates in conventional manner, being connected to the mobile switching centre 41 of the host network 4. The host network 4 may also support one or more further base site controllers 42 controlling conventional base transceiver sites 43. The Mobile Switching Centre 41 also has an associated "Visitor Location Register" 44 which, in conventional manner, records details of the cellular telephones currently co-operating with the Mobile Switching Centre 41, so that details can be exchanged with the Home Location Register 71 of the user's home network for billing purposes, and to allow incoming calls to the handset 10 to be routed correctly. These details include the identity of the BSC 40, 42 to which the user is connected, allowing different call charges to be applied for use in different cells, and in particular for calls made through the onboard base transceiver site 12.

In the cellular mobile network 4, standard GSM functionality is used. Users aboard the ship will be able to use this service provided they are subscribers to the host network 4. They can also use the service if they subscribe to a network 7 which has a "roaming" agreement with the host network 4, if the subscriber has global roaming authorised by his service provider. "Roaming" the arrangement which allows a subscriber to one network to use his cellular telephone when connected to another network.

In use, both parties to a call, and the cellular network, operate normally. The cellular telephone 10 co-operates with the base station 12 on the ship as it would with any other base station 43. The home location register 71 identifies the cellular telephone 10 as currently served by the MSC 41, and routes incoming calls accordingly.

In a variant of this embodiment, the Base Site Controller is on the ship, and the satellite link 3-6-13 is between the MSC 41 and the BSC. This reduces the signalling overhead over the satellite link 3-6-13 as there is much less traffic between an MSC and a BSC than there is between a BSC and a BTS, so the cost of the satellite link can be reduced—perhaps to the extent that an on-demand satellite link may be preferable to a permanently leased one. Despite its onboard physical location, the BSC is still perceived by the network 4 as part of the region served by the MSC 41.

In another variant, a subsidiary mobile switching centre is provided on board the ship, with its own visitor location register. The satellite link 3-6-13 is now between the share based MSC 41 and the onboard MSC. The user record in the HLR 71 will identify the mobile unit 10 as currently served by the onboard MSC, and routes incoming calls (by way of the shore based MSC 41) accordingly. Alternatively, the HLR may merely identify the mobile unit 10 as served by the network 4, and route the call to the MSC 41, which will in turn recognise from its entry in the shore based VLR 44 that this mobile unit is currently being served by the subsidiary MSC.

This arrangement allows integration of the onboard MSC with the ship's internal telephone exchange (PBX). In particular it provides a simple means of providing passengers and crew with a "Wireless PEX" facility, as users on board the ship can communicate with each other through the BSC without using the satellite link 3-6-13. When a call is made by a cellular telephone 10, the serving MSC first consults its VLR to establish whether the called party is currently served by the same MSC. If this is the case, it connects the call without the use of any inter-MSC links. Thus, in this third embodiment, calls made between two users both on board the ship 1 may be made without the use of the satellite link 3-6-13.

If the ship 1 moves into radio range of land-based base transceiver sites 43, signals from the land-based sites may interfere with the onboard BTS 12, and vice verse. It is known for conventional land-based systems to select alternative frequencies or reduce signal strength if such interference is detected. In the present embodiments, the shipboard system is arranged to shut down, for example by discontinuing the satellite link 3-6-13, by switching off the distribution network 11, or by other means, when such interference is detected. Users of mobile telephones 10 on board the ship may then connect to the shore-based BTS 43. If the local network is not the network 4 to which the onboard BTS 12 is connected, users will "roam" from the host network 4 to the local network in conventional manner when such transfer takes place.

FIGS. 2 and 3 illustrate a system intended for use on aircraft. This system can also be categorised into two main components: namely the onboard part 201 (FIG. 2) and the fixed part 202 (FIG. 3), comprising the ground station 203 of the tracking radio system and the "host" cellular network 204, communicating with each other through a satellite connection 206. The onboard part (FIG. 2) comprises a moveable cellular system 211,212,214,216 and the moveable part 213 of the tracking radio system. The fixed part 202 (FIG. 3) is itself in two parts, namely a satellite ground station 203 and the fixed "host" cellular network 204, which is a public land mobile network (PLMN), in turn interconnected with other PLMNs 207 and conventional wired networks (PSTN) 205 to allow calls to be made between users of different networks.

FIG. 3 illustrates in simplified form the system architecture of a "GSM" standard cellular radio system 204, here acting as the fixed "host" network according to the invention. The terminology used in this standard will be adopted in this description, but it should be understood that this is not to be taken as excluding the applicability of this invention from systems operating to other standards such as the proposed UMTS system. A cellular network 204 has a switching system (MSC) 241 to allow connection of one or more base transceiver sites (BTS) 243, through one or more base site control systems 242, to the PSTN 205 and thus to other telephones. A mobile telephone may establish radio contact with one of the base stations 243 in order to make and receive telephone calls. The network 204 also includes a "Visitor Location Register" 244, which maintains details of those cellular telephones currently co-operating with the network. Mobile telephones according to the "GSM" standard are capable of co-operating with different networks ("roaming" between networks). To allow this to take place, when a mobile telephone moves from one network to another, the network to which it has moved retrieves data from a "Home Location Register" 271 permanently associated with the mobile telephone. The network 207 in which the Home Location Register 271 associated with a given telephone is to be found is identifiable from the telephone's identity code. The Home Location Register 271 also records the identity of the network 204 with which the mobile handset is currently operating.

As shown in FIG. 2, the system provides a cellular radio subscriber with the ability to use his own handset 210 aboard an aircraft, located anywhere within an agreed satellite coverage area. The coverage on board the aircraft can be provided by any suitable means, using known radio repeater distribution systems 211 to provide radio coverage wherever required.

The distribution system 211 is fed by a base transceiver site 212, served by a base site controller 214 and a mobile switching centre 216, which has its own visitor location register 217, for onward transmission to the satellite ground station 203 via a satellite tracking system 213. The satellite tracking system may be a conventional satellite telephone system as commonly used for ship-to-shore communications, and for the airborne systems previously referred to, providing a satellite link 206 from the aircraft or ship's satellite tracking system 213 to the satellite ground station 203. The satellite ground station 203 is in turn connected to the mobile switching centre IMSC) 241 of a conventional cellular telephone system, referred to hereinafter as the "host" system 204 and shown in FIG. 3.

The satellite link 203-206-213 is therefore between an MSC 241 (the "host" MSC) of the land-fixed "host" network 204 and the onboard MSC 216. The user record in the HLR 271 identifies the mobile unit 210 as currently served by the land-based network 204, and routes the call to the host MSC 241, which will in turn recognise from its entry in the land based VLR 244 that this mobile unit is currently being served by the onboard MSC 216.

This arrangement allows integration of the onboard MSC 216 with the onboard switching capability associated with the conventional satellite telephone system and the aircraft's internal communications system 215. In particular it provides a simple means of providing passengers and crew with a "Wireless PBX" facility, as users on board the aircraft can communicate with each other through the BSC 214 without using the satellite link 203-206-213. When a call is made by a cellular telephone 210, the onboard MSC 216 first consults its VLR 217 to establish whether the called party is currently served by the same MSC 216. If this is the case, it connects the call without the use of any inter-MSC links. Thus calls made between two users both on board the aircraft 201 may be made without the use of the satellite link 203-206-213. The satellite connection provides several voice channels and a signalling channel (supervisory control-management channel), and can be made by any connection of appropriate capacity.

The host network 204 may support one or more further base site controllers 242 controlling conventional base transceiver sites 243. The Mobile Switching Centre 241 also has an associated "Visitor Location Register" 244 which, in conventional manner, records details of the cellular telephones currently co-operating with the Mobile Switching Centre 241, so that details can be exchanged with the Home Location Register 271 of the user's home network for billing purposes, and to allow incoming calls to the handset 210 to be routed correctly. These details include the identity of the link 203, 242 to which the user is connected, allowing different call charges to be applied for use in different cells, and in particular for calls made through the onboard base transceiver site 212.

When the onboard MSC 216 detects a call attempt or registration attempt from a mobile unit 210. It collects from the mobile unit its identity code (IMSI) and passes it to a processor 218. If the processor 218 has not previously done so. It generates a temporary onboard identity for association with the mobile identity code (IMSI), and stores it in a memory 219. For aircraft fitted with at-seat satellite telephone equipment, each handset has an identity code (generally related to the number of the passenger seat to which the handset is fitted) to allow outgoing calls to be billed to the correct user and to allow the system to be used to communicate between passengers. Spare numbers in this system (referred to herein as "pseudo seat numbers"—PSN) may be used as the temporary onboard identities allocated to mobile handsets working to the onboard MSC 216. If the mobile handset 210 has previously contacted the onboard MSC 216, and not subsequently de-registered, the processor 218 retrieves the PSN corresponding to the IMSI from the memory 219.

In the cellular mobile network 204, standard GSM functionality is used. Users aboard the aircraft will be able to use this service provided they are subscribers to the host network 204 or any network 207 which has a "roaming" agreement with the host network 204, provided the subscriber has international roaming authorised by his service provider. "Roaming" is the arrangement which allows a subscriber to one network to use his cellular telephone when connected to another network.

The ground station 203 is similar to the Ground station 404 (FIG. 4, to be discussed later), and carries out call switching functions to allow calls made from the onboard system to be placed through the public switched telephone network (PSTN) 208 to other telephones, and identifies and authorises the use of terminals of the onboard satellite system.

In this embodiment of the invention, the "host" network 204 operates like a conventional cellular network, but is provided with an interface unit 248 for interworking with the satellite ground station 203. This interface 248 allows the switching centre 241 to obtain user details in particular the identity of a mobile handset) from the satellite system 203 to allow it to appear to the network 204, and thus to the HLR 271 in the user's home network, that the mobile handset is in radio communication with a base station under the control of the mobile switching centre 241 when in fact it is in communication with the onboard MSC 216. The mobile switching centre can then arrange for call forwarding instructions to be stored in the VLR 244, to cause incoming calls directed to that handset to be diverted, through the switching system of the satellite network 203, to the temporary satellite identity (PSN), which allows the onboard MSC 216, to retrieve the original IMSI from the store 219.

The host network translates the called party's IMSI to an AES code, which in this case is the pseudo-seat number (PSN) allocated randomly from the numbers left spare after codes have been allocated for at-seat terminals. The translation takes place in the host network, without the need for the caller to know the AES code. The temporary onboard identity code PSN associated with the called party's IMSI is returned to the onboard MSC 216 which sets up a call over the satellite system to the host MSC 241 of the host network 204. The satellite system requires certain authentication data on call set up, namely the AES code and a subscriber identity code which normally identifies an individual subscriber to the satellite system or, if the user does not have an account with the satellite system, credit card details or other details to allow payment to be made. In the present case the onboard MSC 216 provides the cellular telephone's code (IMSI) as the subscriber identity code. For security reasons, this code may be encrypted. If an outgoing call attempt is being made, a call attempt is then made to the number dialed; otherwise a special code, referred to herein as the non-call code ("NCC") is used.

If the caller has not previously been registered, but a special non-call registration code is used, the ground station 203 recognises it as being an authorised free call to the host MSC 241 and routes it accordingly. Calls using this code are permitted even if the IMSI has not previously been registered with it.

When a call is received from the satellite ground station 203 using the non-call code (NCC) the host MSC 241 routes the call to the interface unit 248, which retrieves the identity (IMSI) of the cellular telephone, and the PSN associated with it. The IMSI (de-encrypted if necessary), is passed to a network registration unit 245 which exchanges signals with the host mobile switching centre 241 in the same way that a real cellular telephone would do if registering through one of its base stations 243. The mobile switching contra therefore informs the user's Home Location Register 271 that the mobile telephone is now registered with the network 204. The Home Location Register 271 records that the mobile handset is now registered with host MSC 241.

It should be noted that, although registered with the host MSC 241, the user's mobile handset is not operatively connected to the host MSC 241. The user, and the handset, may be on a suitably equipped vehicle anywhere in the world within the coverage area of the satellite 206.

The user's details, including any diversion instructions, are next sent by the Home Location Register 271 to the network's VLR 244. A store 247 records a copy of the details of these diversion instructions for subsequent retrieval when the mobile unit deregisters.

Conventionally, any incoming calls for a mobile user are sent in the first instance to the user's home network 207, and the HLR 271 provides information to identify the MSC where the mobile handset is expected to be found, which is the host MSC 241. Consequently, in the present arrangement, any incoming calls intended for the mobile user will now be directed to the network 204, as the mobile user is currently registered there.

The interface unit 248 passes the AES code to a call diversion instruction unit 246, which generates a "divert on busy" instruction to the VLR 244. This is a standard divert arrangement, and operates such that should the mobile unit appear to be already engaged on a call when a new call attempt is made to it, the new call attempt is diverted to a specified directory number, in this case the AES code allocated to the mobile unit. This diversion instruction replaces any previous instruction held in the VLR 244. Finally, the registration process is closed by returning an authorisation code from the host MSC 241 to the subscriber management system 42 of the satellite system 4, to allow the IMSI to be recognised as a valid user identification for subsequent outgoing calls.

Thus any calls for the mobile unit 210 can be diverted by the host MSC 241 to the AES number associated with it in the VLR 244, for transmission to the onboard MSC where the IMSI associated with the AES code is retrieved from the store 219.

FIG. 4 illustrates a further system, primarily designed for use on aircraft already fitted with at-seat satellite telephone terminals.

FIG. 4 shows the general arrangement of the various components which co-operate in the third arrangement. In this system the onboard part 402 comprises one or more handsets 425 (which may be the users' own cellular telephone handsets), connected to a termination point 420 of the satellite network. The termination point 420 is in communication with a ground station 404. In this embodiment, the communication link is again made through an earth-orbiting satellite 406.

The principal components of the ground station 404 relevant to this invention are an antenna 444 which communicates, by way of the satellite 406, with the onboard system 402, an Access Control and Signalling Equipment (ACSE) 440 which carries out call switching functions to allow calls to be placed through the public switched telephone network (PSTN) 408 to other telephones 485, and a Card Management System 442 which identifies and authorises the use of individual terminals 420. Associated with the card management system there is an "aircraft location register" 441 which monitors the terminal currently served by each individual satellite, and modifies the functioning of the card management system when a terminal 420, for example on board an aircraft 402, moves from the coverage area of one satellite 406 (and its ground station 444) to another. There is also a register 443 of card identities, to provide a correspondence between the user identities used by the satellite terminal and the corresponding cellular telephone user identities (not necessary if the cellular telephone identity is read directly by the terminal 420), and to provide billing information.

The card management system 442 interacts with an interface unit 452 of a "host" cellular telephone network 405. This network 405 is connected to the public switched telephone network (PSTN) 408 and to other cellular networks 407 through a switching centre 450.

The cellular network 407 is similar to the cellular network 204 shown in FIG. 2. It has a switching system (MSC) 470 to allow connection of one or more base transceiver sites (BTS) 474, through one or more base site control systems 472, to the PSTN 408 and thus to other telephones 485. A mobile telephone 475 may establish radio contact with one of the base stations 474 in order to make and receive telephone calls. The network 407 also includes a "Visitor Location Register" 471, which maintains details of those cellular telephones 475 currently co-operating with the network 407. Mobile telephones according to the "GSM" standard are capable of co-operating with different networks ("roaming" between networks). To allow this to take place, when a mobile telephone 475 changes from one network to another, the network to which it has moved retrieves data from a "Home Location Register" 473 permanently associated with the handset 475. The network 407 in which the Home Location Register 473 associated with a given handset is to be found is identifiable from the handset's identity code. The Home Location Register also records the identity of the network 407 with which the mobile handset 475 is currently operating.

The "host" network 405 operates like conventional cellular network, but is provided with an interface unit 452, which interacts with the mobile switching centre 450 as a base site controller would. This interlace unit 452 may be in addition to one or more base site controllers (not shown). The interface unit does not interact with any base transceiver sites or mobile handsets, but obtains user details (in particular the identity of a mobile handset) from the card management system 442 to allow it to appear to the switching centre 460, and the HLR 473 in the user's home network, that it is in radio communication with a mobile handset. It can then control the call forwarding instructions stored in the VLR 461, to cause incoming calls directed to that handset to be diverted, through the switching system 440 of the satellite network 404, to the satellite terminal 420.

FIG. 5 shows the process carried out according to the invention. The onboard system 1, 201, 402 is arranged to be switched off at times when its operation could interfere with conventional land-based cellular systems or with the electronic control systems of the vehicle, to enforce "quiet" periods on board, or to allow transfer of the satellite link from one satellite to another. The control to switch the system off may be performed manually or under the control of a sensor detecting interference from nearby radio base stations, or an operational condition of the vehicle such as deployment of the aircraft undercarriage, low altitude, or "weight on wheels", communicated to the onboard system by means of a control databus e.g. 222 as shown in FIG. 2.

When such a disconnection occurs (step 601), a signal is generated in the onboard system 13, 213, 420 (step 5021 for transmission over the satellite link 6, 206, 406 to the ground station 3, 203, 444 (step 503). This signal causes the satellite ground station to invoke a call failure mode for any call directed to the onboard system 1, 201, 402 of the specified vehicle (step 504).

Any call now diverted by the MSC 41, 241, 470 to a number corresponding to a node on board the vehicle (step 505) will then receive a "call failed" indication from the ground station (step 506), without any signalling required over the satellite link 6, 206, 406. Such failed calls will be re-routed according to the user's own diversion instructions, stored by the host MSC 41, 241, 470 for use when the user's handset is busy (step 507). Generally, such instructions will be to divert the call to a voicemail system in the user's home network. In addition, the host MSC 41, 241, 470 will record the existence, and possibly the origin (Calling line identity—CLI) of any such call attempts (step 508).

When the onboard system 13, 213, 420 is re-activated (step 511) a further signal is transmitted by the onboard system (step 512) for transmission over the satellite link 6, 206, 406 to the ground station 3, 203, 444 (step 513). This signal causes the satellite ground station to revoke the call failure mode for calls directed to the onboard system 1, 201, 402 of the specified vehicle (step 514). When a user 10, 210, 425 reconnects to the onboard system 13, 213, 420 (step 515) the onboard system 13, 213, 420 transmits a signal to the host MSC 41, 241, 470 (step 516) which causes the host MSC to retrieve the cell attempt record previously stored for that user (step 518). If one or more such call attempts have been made, the MSC returns a message to the user 10, 210, 425 (step 519), prompting the user to retrieve his messages from the voicemail system should he so wish.

The invention claimed is:

1. A method for providing wireless service aboard a ship, comprising:
    providing first and second wireless coverage zones, the first zone being substantially confined to an interior of the ship and the second zone providing an effective range of coverage above-deck or outside the ship;
    reducing, in response to interference above a desired level between the second zone and a land-based wireless node, the effective range of coverage of the second zone;
    wherein said reducing does not change the area covered by the first wireless coverage zone.

2. The method of claim 1, wherein said reducing the effective range of coverage lowers the interference to below the desired level.

3. The method of claim 2, further comprising:
    suspending the provision of wireless service in the second zone in response to the interference exceeding the desired level regardless of said reducing; and
    continuing wireless service in the first zone during said suspending.

4. A method of providing ship-based wireless service aboard a ship as the ship approaches another wireless network, the method comprising:
    providing, when the ship is outside of a first predetermined distance from the another wireless network, a first effective range for the ship-based wireless coverage;
    maintaining, when the ship is outside of a second distance from the another wireless network but within the first distance, the ship-based wireless service at a second effective range, which is smaller than the first effective range; and
    suspending said ship-based wireless service when the ship is within the second distance.

5. The method of claim 4, wherein the first effective range is substantially fixed.

6. The method of claim 4, wherein the second effective range is variable.

7. The method of claim 4, wherein the first distance is a minimum distance at which the first effective range of the ship-based wireless service will not provide wireless service to users within the another wireless network.

8. The method of claim 4, wherein the second distance is a minimum distance at which the second effective range of the ship-based wireless service will not overlap with a predetermined area around the another wireless network.

9. The method of claim 4, wherein the first distance is a minimum distance at which the first effective range of the ship-based wireless service will not extend into the area determined by the second distance.

10. The method of claim 4, wherein the second distance is based on an outer boundary set by a controlling legal authority within which said ship is not permitted to provide wireless service.

11. The method of claim 4, wherein the ship-based wireless coverage is a first ship-based wireless coverage that extends above deck and outside the ship, the method further comprising:
    providing a second ship-based wireless coverage that extends below deck independent of said providing the first ship-based wireless coverage;
    wherein said providing a second first ship-based wireless coverage is not interrupted by said maintaining or said suspending.

12. A ship, comprising:

first and second sections of said ship, said first section including the external portions of the ship and said second section including at least below decks areas of said ship;

first and second wireless networks dedicated to said first and second sections, respectively;

means for controlling an effective range of the first wireless network to prevent the first wireless network from providing wireless service to wireless devices outside the legal jurisdiction of the ship;

wherein an effective range of the second wireless network does not change in association with a change in the effective range of the first wireless network.

13. The ship of claim 12, wherein said means for controlling will set the effective range of the first wireless network to:

a predetermined level when the effective range does not overlap with the coverage of another wireless network;

a reduced level when the predetermined level would overlap with the coverage of another wireless network; and zero when overlap cannot be avoided regardless of how small the reduced level is.

* * * * *